United States Patent [19]

Mohri et al.

[11] Patent Number: 5,193,080
[45] Date of Patent: Mar. 9, 1993

[54] MAGNETO-OPTICAL RECORDING MEDIUM AND APPARATUS

[75] Inventors: Masanari Mohri, Katano; Osamu Mizuno, Osaka; Tohru Nakamura, Katano, all of Japan

[73] Assignee: Matsushita Electric Industrial Co., Ltd., Osaka, Japan

[21] Appl. No.: 547,154

[22] Filed: Jul. 3, 1990

[30] Foreign Application Priority Data

Jul. 6, 1989 [JP] Japan .................................. 1-174712

[51] Int. Cl.$^5$ ...................... G11B 17/00; G11B 11/00
[52] U.S. Cl. ...................................... 369/244; 369/13; 369/215; 369/219; 369/220; 360/59; 360/114
[58] Field of Search ............... 369/215, 219, 220, 221, 369/249, 13, 14, 15, 244, 44.16, 44.18, 44.22, 32, 43, 44.11, 275.1, 275.2

[56] References Cited

U.S. PATENT DOCUMENTS

| 4,443,721 | 4/1984 | Jansen ................... 369/44.22 |
| 4,701,894 | 10/1987 | Watson .................. 369/13 |
| 4,706,234 | 11/1987 | Okada ................... 369/244 |
| 4,712,203 | 12/1987 | Saito et al. ............ 360/59 |
| 4,740,946 | 4/1988 | Yumura et al. ......... 369/219 |
| 4,799,766 | 1/1989 | Estes .................... 369/44.22 |
| 4,814,907 | 3/1989 | Goor .................... 369/44.22 |
| 4,991,163 | 2/1991 | Tokushuku et al. ..... 369/275.3 |
| 5,027,334 | 6/1991 | Yamanara et al. ...... 369/13 |

FOREIGN PATENT DOCUMENTS

| 0150145 | 9/1982 | Japan .................. 369/44.22 |
| 0057638 | 4/1983 | Japan .................. 369/44.22 |
| 0168180 | 7/1986 | Japan .................. 369/244 |
| 61-258354 | 11/1986 | Japan . |
| 0185269 | 8/1987 | Japan .................. 360/114 |
| 0014128 | 4/1988 | Japan .................. 369/44.22 |
| 0076135 | 4/1988 | Japan .................. 360/114 |
| 0173346 | 7/1989 | Japan .................. 369/13 |
| 0287849 | 11/1989 | Japan .................. 369/13 |
| 0014447 | 1/1990 | Japan .................. 369/44.22 |
| 0023545 | 1/1990 | Japan .................. 369/44.22 |
| 1254551 | 8/1986 | U.S.S.R. ............... 369/44.22 |

Primary Examiner—Eugene R. LaRoche
Assistant Examiner—Tan Nguyen
Attorney, Agent, or Firm—Wenderoth, Lind & Ponack

[57] ABSTRACT

Guide parts and driving parts are independently provided for an optical head and a magnetic bias field generator, and a relative position control part controls the relative positions of the two so that the both can access recording medium tracks individually. Furthermore, a magnetic pattern track for use as the detection signal of the absolute position of the magnetic bias field generator to the magneto-optical recording medium is formed on the magneto-optical recording medium itself, and a positioning control part of the magnetic bias field generator using this magnetic pattern track is provided, so that the positioning control of the absolute position of the magnetic bias field generator with respect to the magneto-optical recording medium may be realized.

4 Claims, 6 Drawing Sheets

MAGNETO-OPTICAL RECORDING MEDIUM AND APPARATUS

BACKGROUND OF THE INVENTION

1. Field of the Invention

The present invention relates to a magneto-optical recording and reproducing apparatus to be used in an external memory unit of an electronic computer, a recording and reproducing apparatus of audio, video or other information, and the like.

2. Description of the Prior Art

The magneto-optical recording and reproducing apparatus has been recently enhanced intensively in performance by shortening the recording, reproducing and erasing time of information in a magneto-optical recording medium, increasing the recording capacity, and accelerating the access speed.

In the magneto-optical recording and reproducing apparatus, moreover, there is a growing need for an overwrite function. As an effective method, research is actively concentrated on the magnetic field modulation overwrite method using a bias magnetic field generating apparatus which has a short inverting time in the direction of the magnetic field.

A conventional magneto-optical disk apparatus is explained below by referring to FIG. 6 which is a perspective view of a conventional magneto-optical disk apparatus.

Figure 6:
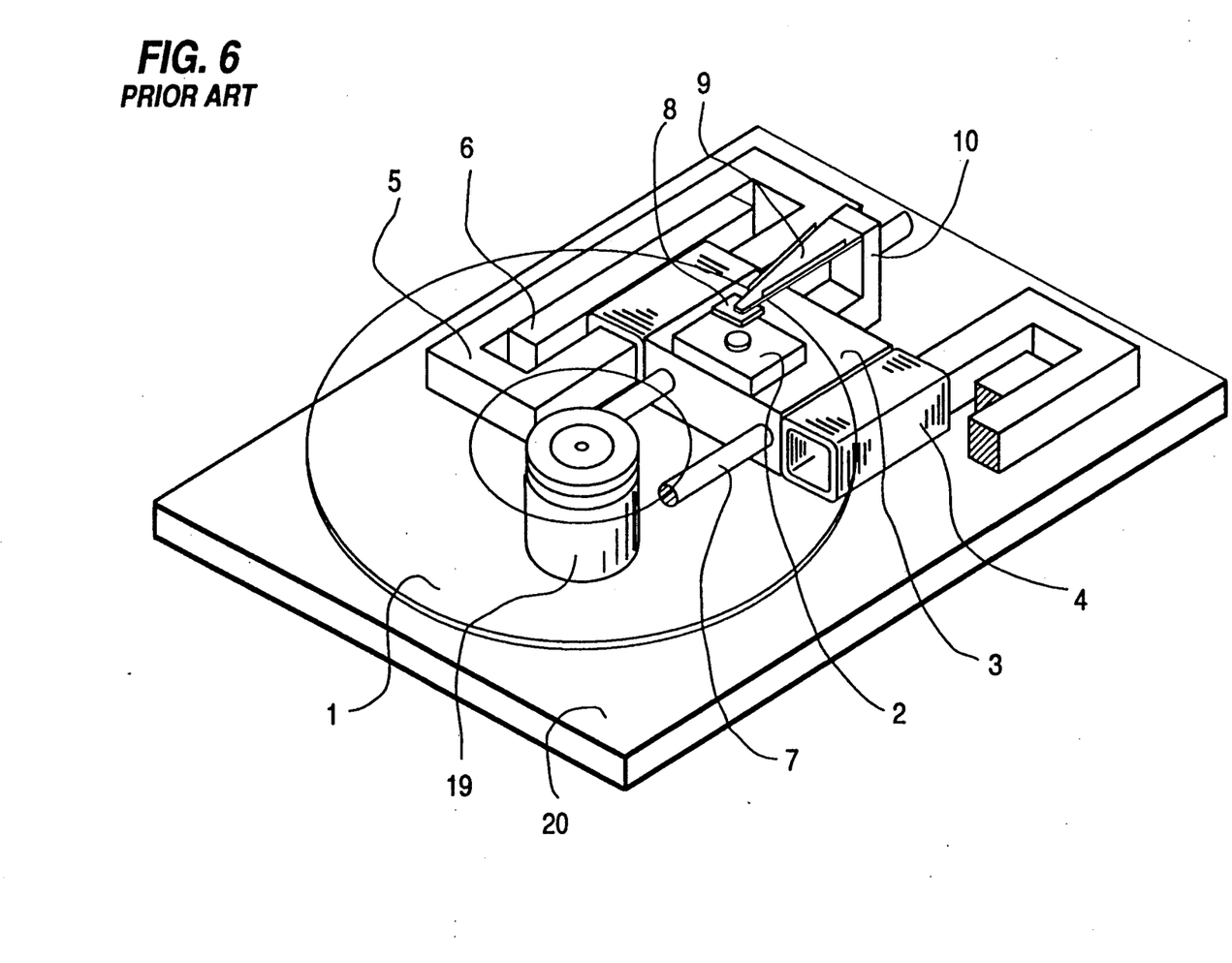
FIG. 6 is a perspective view showing of a conventional magneto-optical disk apparatus.

In FIG. 6, numeral 1 is a magneto-optical disk, 2 is an objective lens actuator, 3 is an optical head, 4 is a first drive coil, 5 is a first magnetic yoke, 6 is a first magnet, 7 is a first guide shaft, 8 is a magnetic bias field generator, 9 is a support beam, 10 is a connector, 19 is a spindle motor, and 20 is a base for the mechanism.

This construction is described below. In FIG. 6, the magneto-optical disk 1 possesses a magneto-optical recording layer. The objective lens actuator 2 is fixed on the optical head 3. The optical head 3 is slidably supported by the first guide shaft 7 so as to be free to move linearly in the radial direction of the magneto-optical disk 1. The connector 10 is fixed on the optical head 3. The magnetic bias field generator 8 is positioned by the connector 10 through the support beam 9. Its positioning range is the area in which the optical axis of the light spot emitted to a desired radial position of the magneto-optical recording layer of the magneto-optical disk 1 from the objective lens actuator 2 is located within its effective magnetic field region. The first drive coil 4 is fixed on the optical head 3. The first magnet 6 is fixed on the first magnetic yoke 5, thereby composing a magnetic circuit.

The operation of thus composed magneto-optical disk apparatus is described below. The optical head 3 obtains the driving force by the magnetic field generated by the magnetic circuit composed of the magnetic yoke 5 and magnet 6, and the electromagnetic field generated by the current passed into the drive coil 4 fixed on the optical head 3. Further, to meet the request of the magnetic field modulation overwrite mentioned above while maintaining a high density recording, it is necessary to shorten the magnetic field inverting time of the magnetic bias field generator 8. For example, a same capacity as the magnetic head used in a magnetic recording apparatus (such as hard disk apparatus) is required. The effective magnetic field region of such a magnetic bias field generator 8 (the distance to the medium, the region on the medium) is characterized by narrowing in correlation with the shortening of the magnetic field inverting time. Accordingly, the connector 10 is mechanically responsible for proximity positioning of the magnetic bias field generator 8 and magneto-optical disk 1, and positioning for matching the optical axis of the light spot from the optical head to the vicinity of the center of its magnetic field region. Furthermore, while the optical head 3 is moving in the radial direction of the magneto-optical disk 1 (at the time of track access), the connector 10 is moving the both in phase while maintaining the mutual relative positions.

In such a conventional structure, however, the following problems were experienced because the magnetic bias field generator and the optical head are mechanically coupled by means of an elastic support member and connector.

First of all, there is a problem of volumetric change of the mechanical coupling part due to temperature changes in the apparatus during operation of the apparatus. In other words, an error is caused in the relative positions due to volumetric changes of the mechanical coupling part, between the gap position of the magnetic bias field generator and the light spot position of the optical head, which should be on the same track position of the magneto-optical medium.

Next, a positioning error occurs between the magnetic bias field generator and the optical head when assembling the apparatus. That is, the positional error between the two among individual apparatuses may lead to deterioration of reproducibility of the recording, reproducing and erasing actions in the same conditions on a certain variable magneto-optical disk.

Another problem is the disturbance by the magnetic bias field generator to the track access characteristics due to the optical head. The magnetic bias field generator oscillates while following up the surface deflection of the magneto-optical disk. This oscillating action is transmitted to the optical head through the connector, and becomes a disturbance to lead to resonance of the pitching mode of the optical head.

Therefore, the mechanical coupling of the optical head and the magnetic bias field generator may induce relative position deviations of the magnetic bias field generator and optical head due to assembling error or temperature characteristics, or deterioration of dynamic characteristics of the optical head due to transmission of vibration energy.

SUMMARY OF THE INVENTION

It is hence a primary object of the invention to present an magneto-optical recording and reproducing apparatus, capable of solving the problems of the prior art, avoiding relative position deviations of the optical head and magnetic bias field generator due to assembling error or temperature characteristics, realizing recording, reproducing and erasing a reloadable medium in same conditions, and enhancing dynamic characteristics of the optical head.

To achieve the above object, an optical head and a magnetic bias field generator are structured so as to be accessible to a track separately from each other. More specifically, guide means and drive means are provided independently for the optical head and the magnetic bias field generator. A relative position control means is provided for controlling the relative positions of the optical head and the magnetic bias field generator.

A magnetic pattern track is formed on a magneto-optical recording medium for detection of an absolute position of the magnetic bias field generator. A positioning control means for positioning the magnetic bias field generator is responsive to detection information obtained from the magnetic pattern track.

In this construction, the optical head and the magnetic bias field generator are independently supported and driven, and the mutual relative positions are detected and controlled. Therefore, the dynamic characteristics are enhanced by avoiding transmission of vibratory energy between the two, while the relative positioning precision is improved against temperature changes or assembling errors. In reproducing, moreover, only the optical head can be independently accessed to a desired track, so that a high speed operation is also, realized.

Moreover, by forming a magnetic pattern track on the magneto-optical recording medium, it is possible to correct the individual errors between apparatuses due to the magneto-optical recording media. That is, by employing the magnetic pattern track, the relative position control means and the positioning control means, the individual apparatuses can record, reproduce and erase in the same conditions on a certain magneto-optical recording medium.

BRIEF DESCRIPTION OF THE DRAWINGS

FIG. 3-1 and 3-2 are a schematic diagram showing a signal detection method of relative positioning control in the first embodiment of the invention, FIG. 5-1 and 5-2 are a schematic diagram showing a signal detection method of positioning control in the first embodiment of the invention.

DESCRIPTION OF THE PREFERRED EMBODIMENT

Referring now to the drawings, an embodiment of a magneto-optical disk apparatus of the invention is described below.

Figure 1:
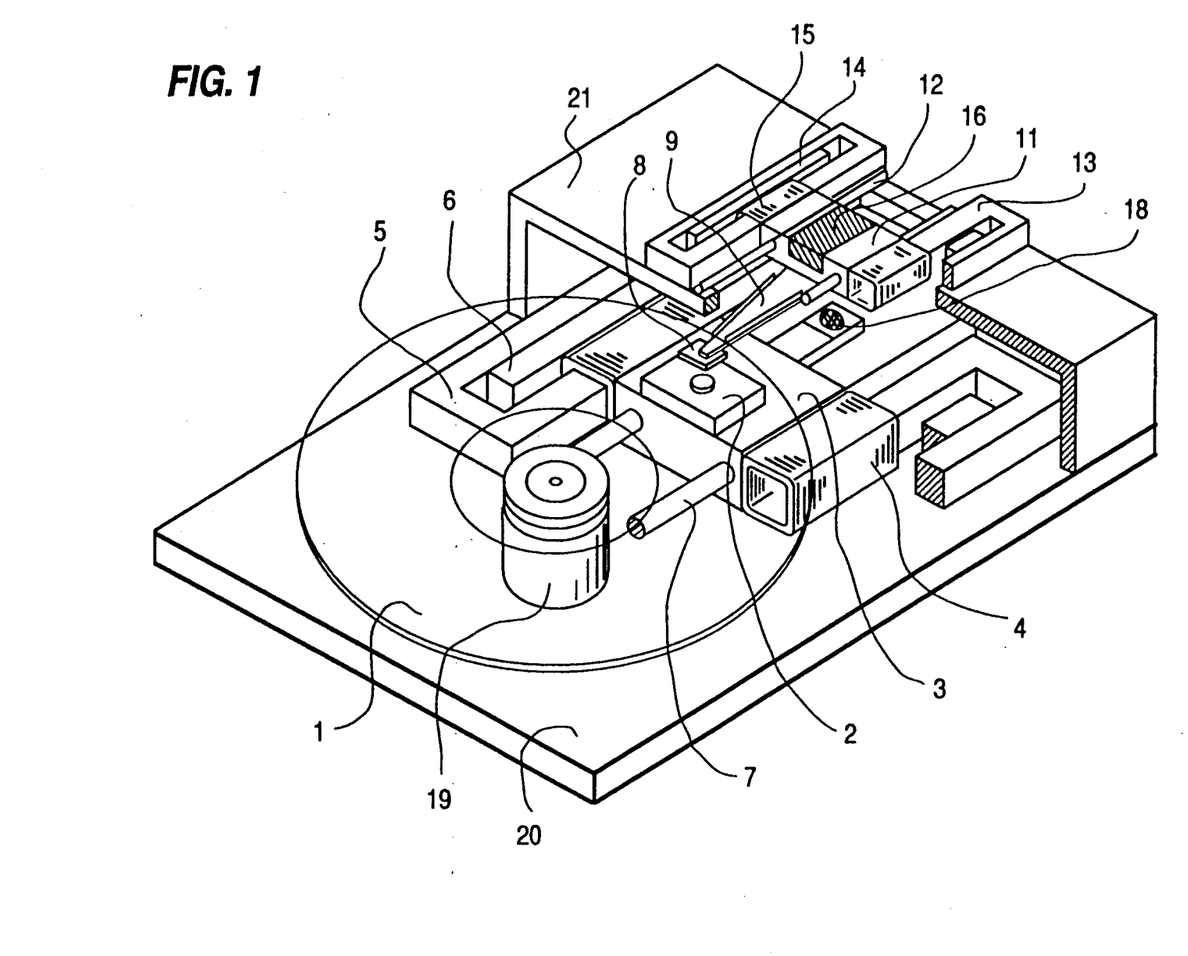
FIG. 1 is a perspective view showing the entire structure of a magneto-optical disk apparatus in a first embodiment of the invention.

FIG. 1 is a perspective view showing the entire structure of a magneto-optical disk apparatus in the first embodiment of the invention. In FIG. 1, numeral 1 is a magneto-optical disk, 2 is an objective lens actuator, 3 is an optical head, 4 is a first drive coil, 5 is a first magnetic yoke, 6 is a first magnet, 7 is a first guide shaft, 8 is a magnetic bias field generator, 9 is a support beam, 11 is a carriage, 12 is a second guide shaft, 13 is a second magnetic yoke, 14 is a second magnet, 15 is a second drive coil, 16 is a photo-detector, 18 is a light source, 19 is a spindle motor, 20 is a base for the mechanism, and 21 is a sub-base for the mechanism.

The structure is explained below. In FIG. 1, the objective lens actuator 2 is fixed on the optical head 3. The optical head 3 is slidably supported on the first guide shaft 7 so as to be free to move linearly in the radial direction of the magneto-optical disk 1. The magnetic bias field generator 8 is fixed on the carriage 11 through the support beam 9. The carriage 11 is slidably supported on the second guide shaft 12 so as to be free to move linearly in the radial direction of the magneto-optical disk 1. The photo-detector 16 is fixed on the carriage 11. The light source 18 is fixed on the optical head 3. The detecting surface of the photo-detector 16 and the emitting surface of the light source 18 are disposed so as to be opposite to each other. The first drive coil 4 is fixed on the optical head 3. The first magnet 6 is fixed on the first magnetic yoke 5, thereby composing a magnetic circuit. The second drive coil 15 is fixed on the carriage 11. The second magnet 14 is fixed on the second magnetic yoke, thereby composing a magnetic circuit.

The operation of thus composed magneto-optical disk apparatus is described below. The optical head 3 is driven by the magnetic field generated in the magnetic circuit composed of the first magnetic yoke 5 and first magnet 6, and the electromagnetic force generated by the current passing in the first drive coil 4 fixed on the magnetic head 3. The carriage 11 is driven by the magnetic field generated in the magnetic circuit composed of the second magnetic yoke 13 and second magnet 14, and the electromagnetic force generated by the current passing in the second drive coil 15 fixed on the carriage 11.

Therefore, by avoiding the vibratory energy transmission of the two, the dynamic characteristics in access are enhanced. In reproduction, only the optical head can be accessed to a desired track, so that the speed is increased.

In the foregoing embodiment, if the support means to enable to move the optical head 3 and carriage 11 is replaced by support means composed of corresponding plural guide shafts and plural roller bearings, the same operation will be obtained. Alternately, the action is the same if the support means is replaced by rotatable support means with one common rotary shaft comprising the optical head 3 and carriage 11.

In the embodiment, if the magnetic bias field generator 8 is a floating magnetic head which floats by the air flow generated by the rotation of the recording disk, and presents recording and erasing magnetic fields while keeping an approximately specific distance from the recording medium, the same operation will be obtained.

Figure 2:
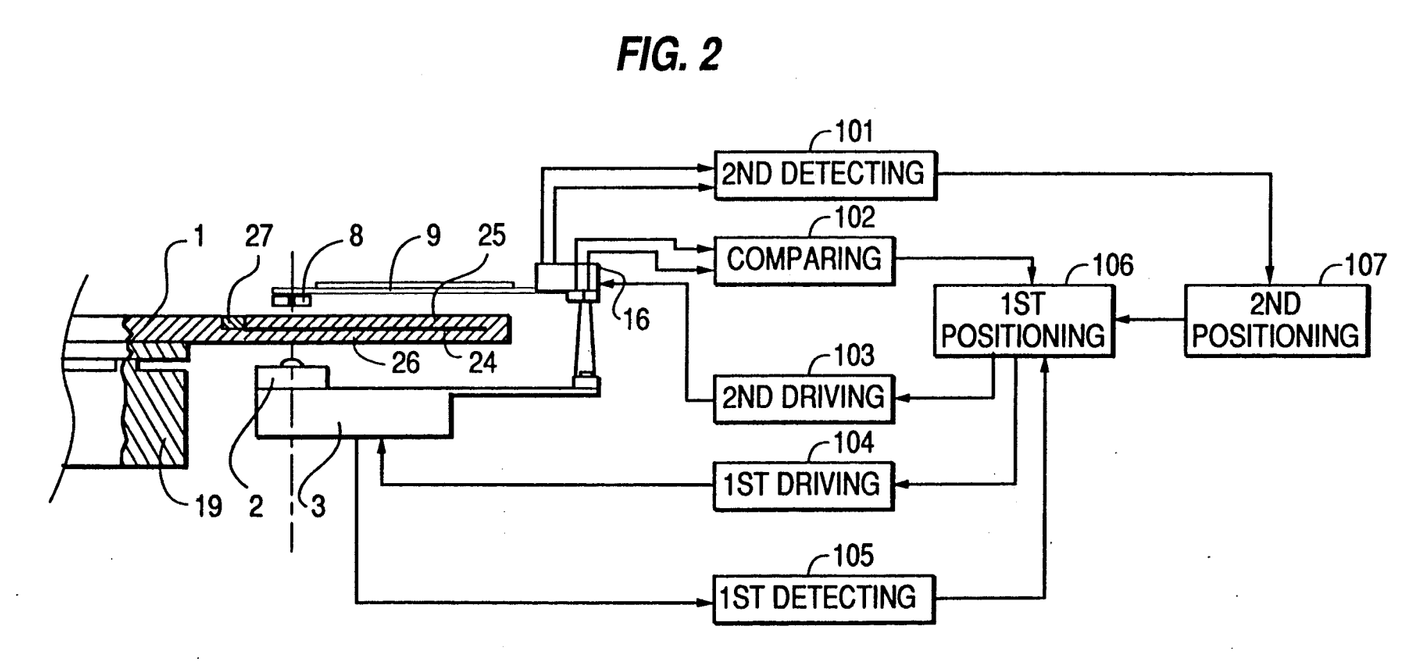
FIG. 2 is a block diagram showing the circuit composition for positioning control in the first embodiment of the invention.

FIG. 2 is a block diagram showing the circuit composition of the positioning control in the first embodiment. In FIG. 2, a second detecting circuit 101 converts the position information from the magnetic bias field generator 8 into a position error signal, which is delivered to a second positioning circuit 107. A comparing circuit 102 converts the relative position information from the light source 16 into a relative position signal, which is delivered to a first positioning circuit 106. The first positioning circuit 106 delivers first and second servo signals for the relative position control means described below, to first driving circuit 104 and second driving circuit 103. The second positioning circuit 107 delivers initial position setting information for the absolute position control means described below to the first positioning circuit 106. The second driving circuit 103 converts the second servo signal, and delivers the second driving current to the second drive coil 15 (shown in FIG. 1). The first driving circuit 104 converts the first servo signal, and delivers the first driving current to the first drive coil 4 (FIG. 1). The first detecting circuit 105 converts the information signal from the optical head 3 (FIG. 1) into a third servo signal, which is delivered to the first positioning circuit 106, while the data signal on the recording medium is delivered.

Figures 31, 32:
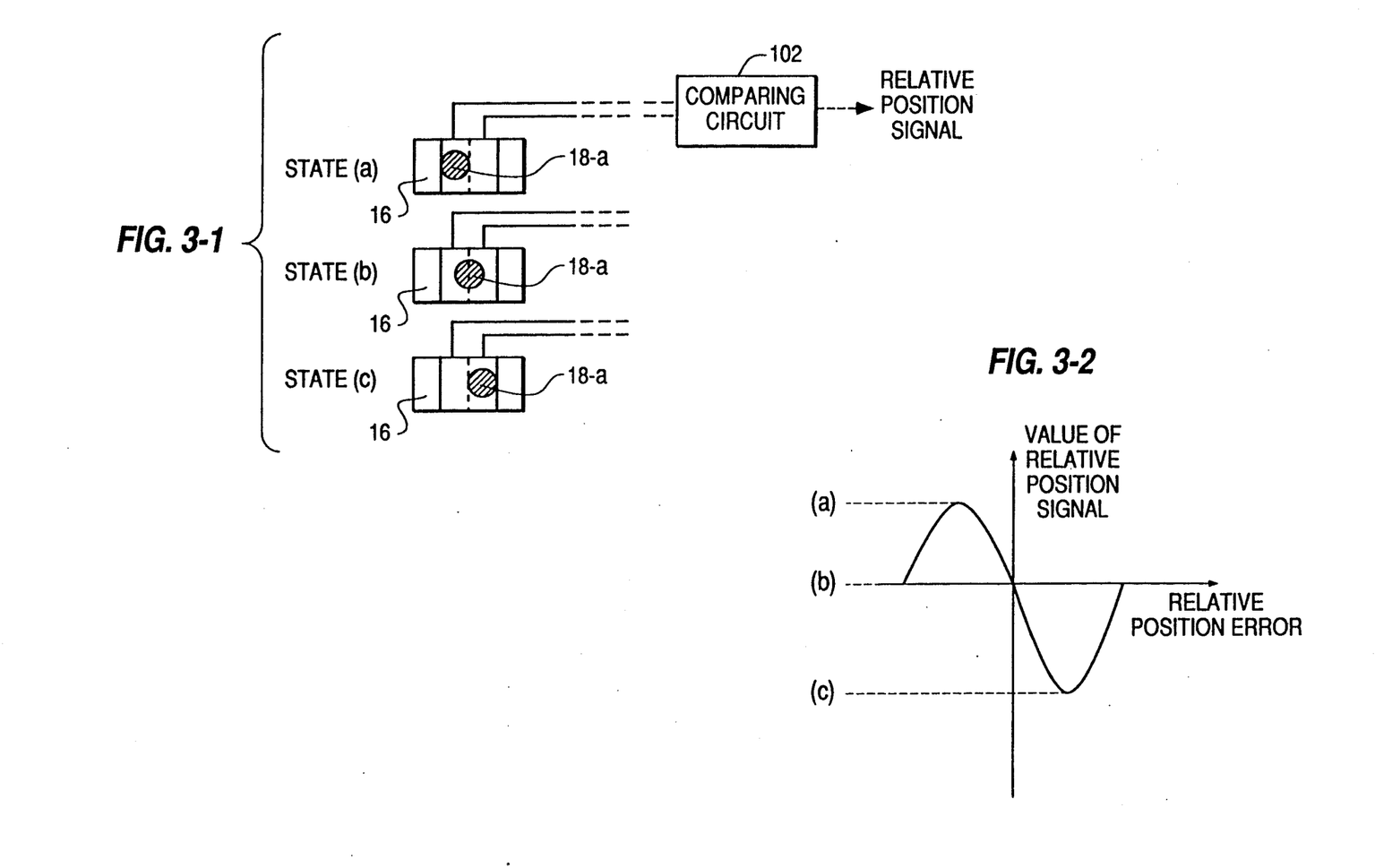

FIG. 3 is a schematic diagram showing the signal detecting method of the relative positioning control in the first embodiment. In FIG. 3-1, numeral 18-a is a light spot on the photo-detector 16 of the light beam from the light source 18. The states (a), (b), (c) represent the relative positions of the magnetic bias field generator 8 and optical head 3, by using the light source 18 and photo-detector 16. That is, of these three states, the state (b) means that the magnetic bias field generator 8 and the optical head 3 are positioned on a same track on the magneto-optical disk 1. The waveform in FIG. 3-2 is a plotting of relative position signals delivered from the comparing circuit 102, in which the axis of ordinates denotes the relative position signal value, and the axis of abscissas refers to the relative position error. The first positioning control circuit 106 delivers the first and second servo signals to the first and second driving circuits 104 and 103 so that the value may be always located near the origin with respect to the relative position signal denoting such a characteristic, in other words, so that the state (b) may be maintained. Therefore, when the optical head 3 accesses to a desired track on the magneto-optical disk 1, by maintaining the state (b), the situation is equivalent to that in which the optical head 3 and the magnetic bias field generator 8 are in a coupled state.

Therefore, without using any mechanical coupling means, and without making contact, the optical head 3 and the magnetic bias field generator 8 are effectively coupled together. Moreover, by detecting and controlling the relative positions of the two (3, 8), the relative positioning precision of the two (3, 8) against temperature changes or assembling errors may be enhanced.

In the foregoing embodiment, the same effects are obtained if the light source 18 and photo-detector 16 are replaced by a magnetic field generator (e.g. magnet) and magnetic field detector (e.g. Hall element), respectively.

Figure 4:
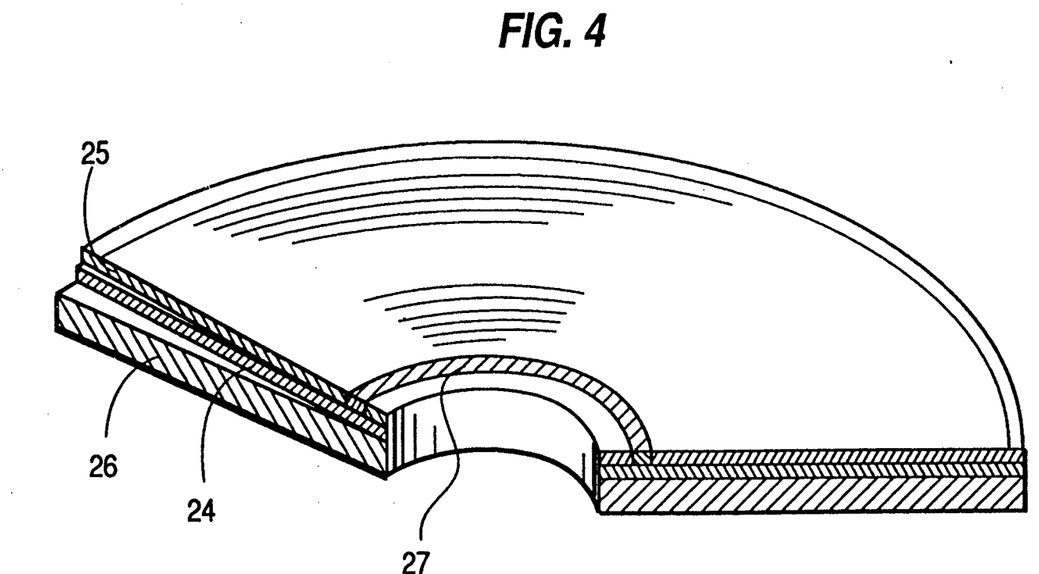
FIG. 4 is a schematic diagram of a magneto-optical disk comprising a magnetic pattern track in the first embodiment of the invention.

FIG. 4 is a schematic diagram of a magneto-optical disk having a magnetic pattern track in the first embodiment. In FIG. 4, numeral 24 is a magneto-optical recording layer, 25 is a protective layer, 26 is a substrate, and 27 is a magnetic pattern track. The magneto-optical recording layer 24, protective layer 25 and substrate 26 are in a laminate structure as shown in FIG. 4, and the magnetic pattern track 27 is laminated on the laminate surface of the magneto-optical recording layer 24 on the substrate 26, and with a predetermined width at a predetermined radius position out of the recording region. The magnetic pattern track 27 may be laminated on the protective layer 25. On the magneto-optical recording layer 24 adjacent in the approximately vertical direction to the magnetic pattern track 27 and magneto-optical disk surface, pattern information that can be detected by the optical head 3 is formed.

In thus composed magneto-optical disk, by reproducing the magnetic pattern track 27 by using the magnetic bias field generator 8, the position information of the magnetic bias field generator 8 in the magneto-optical disk 1 is detected.

Figures 51, 52:
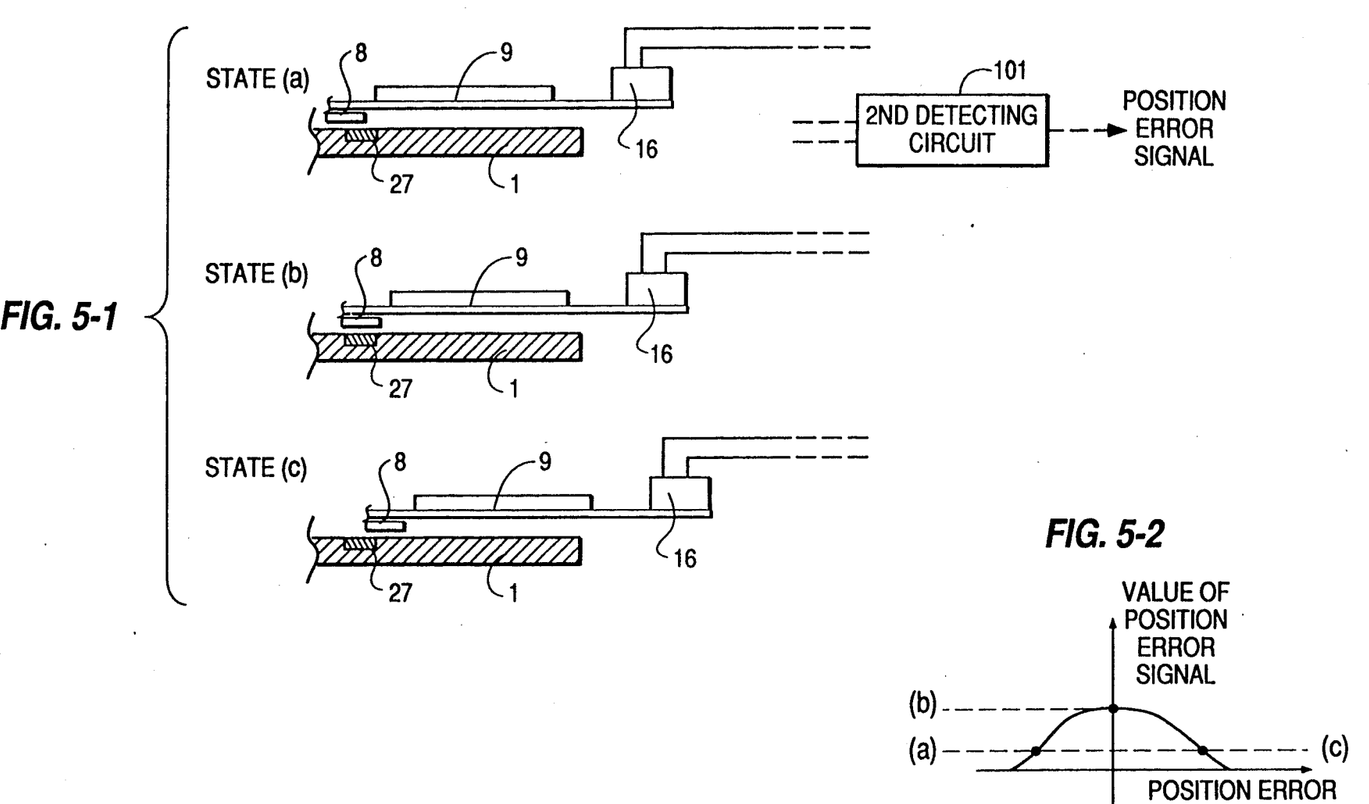

FIG. 5 is a schematic diagram showing the signal detection method of positioning control in the first embodiment of the invention. In FIG. 5-1, the states (a), (b), (c) denote the configuration of the magnetic bias field generator 8 and magnetic pattern track 27. That is, of the three states, the state (b) denotes that the magnetic bias field generator 8 is positioned near the center of the width of the magnetic pattern track 27. The waveform in FIG. 5-2 is a plotting of position error signals delivered from the second detecting circuit 101, in which the axis of ordinates denotes the position error signal and the axis of abscissas represents the position error. In response to the position error signal denoting such characteristics, the second positioning circuit 107 controls the second driving circuit 103 via the first positioning circuit 106 so that the value of the position error signs becomes a certain predetermined value, or so that the state (b) shown in FIGS. 5-1 and 5-2 is attained. Therefore, since the radius position of the magnetic pattern track 27 on the magneto-optical disk 1 is known, the state (b) is equivalent to that in which the magnetic bias field generator 8 is at a predetermined position on the magneto-optical disk 1.

Therefore, by using the magnetic pattern track 27 and the second positioning circuit 107, the initial error of the first positioning circuit 106 may be corrected.

Further, by using the magnetic pattern track 27 and the positioning circuits 106, 107, the individual differences among apparatuses due to the magneto-optical recording media may be corrected. In other words, the individual apparatuses can record, reproduce and erase in same conditions on a certain magneto-optical recording medium.

The invention, not limited to the embodiment mentioned herein, may be modified in various forms without departing from the true scope and spirit of the invention.

What is claimed is:

1. A magneto-optical recording and reproducing apparatus comprising:
    an optical head for forming an optical spot on a magneto-optical recording medium;
    first driving means for moving the optical head while maintaining a predetermined gap to the magneto-optical recording medium;
    a magnetic bias field generator disposed at a position opposite to the optical head across the magneto-optical recording medium for generating a magnetic field in an area of the magneto-optical recording medium in which the optical spot is formed;
    second driving means for moving the magnetic bias field generator in the same direction as a moving direction of the optical head;
    detecting means for detecting a relative positional relationship between the optical head and the magnetic bias field generator and outputting a detection signal indicative of the relative positional relationship; and
    control means responsive to the detection signal from the detecting means for controlling positions of the optical head and magnetic bias field generator to obtain a predetermined relative positional relationship therebetween,
    position initializing means for initializing a position of the magnetic bias field generator to a reference position relative to the magneto-optical recording medium, wherein said control means controls said first driving means to move the optical head to be in the predetermined relative positional relationship to the magnetic bias field generator.

2. A magneto-optical recording and reproducing apparatus comprising:

an optical head for forming an optical spot on a magneto-optical disk having thereon a recording area in which concentric or spiral recording tracks are formed;

first guide means for supporting and guiding therealong the optical head movably in a direction crossing the recording tracks in a movable range covering the recording area of the magneto-optical disk while maintaining a predetermined gap to the magneto-optical disk;

first driving means for driving the optical head to move along the first guide means;

a magnetic bias field generator disposed at a position opposite to the optical head across the magneto-optical disk for generating a magnetic field in an area in which the optical spot is formed;

second guide means for supporting and guiding therealong the magnetic bias field generator movably in the direction crossing the recording tracks in a movable range covering the recording area of the magneto-optical disk independently of the movement of the optical head along the first guide means while maintaining a predetermined gap to the magneto-optical disk;

second driving means for driving the magnetic bias field generator to move along the second guide means;

detecting means for detecting a relative positional relationship between the optical head and the magnetic bias field generator and outputting a detection signal indicative of the relative positional relationship; and control means responsive to the detection signal from the detection means for controlling the relative positional relationship between the optical head and the magnetic bias field generator to obtain a predetermined relative positional relationship therebetween, position initializing means for initializing a position of the magnetic bias field generator to a reference position relative to the magneto-optical recording medium, wherein said control means controls said first driving means to move the optical head to be in the predetermined relative positional relationship to the magnetic bias field generator.

3. An apparatus according to claim 2, wherein the magneto-optical disk has formed thereon a magnetic pattern track in an area out of the recording area, and wherein said apparatus further comprises means for detecting the magnetic pattern track, and means for determining a reference position of the magnetic bias field generator relative to the magneto-optical disk according to the detected magnetic pattern track.

4. A magneto-optical disk having a recording area in which concentric or spiral recording tracks carrying optically detectable information are formed, and having a magnetically detectable magnetic pattern track formed in an area external the recording area, said magnetically detectable magnetic pattern track for determining aa reference position of a magnetic bias field generator relative to said magneto-optical disk.

* * * * *